US005375210A

United States Patent [19]

Monnes et al.

[11] Patent Number: 5,375,210

[45] Date of Patent: Dec. 20, 1994

[54] DISPLAY MODE QUERY AND SET

[75] Inventors: Peter J. Monnes; James G. Wilkinson, both of Baca Raton, Fla.

[73] Assignee: International Business Machines Corp., Armonk, N.Y.

[21] Appl. No.: 870,370

[22] Filed: Apr. 17, 1992

[51] Int. Cl.[5] .......................... G06F 13/00; G06F 3/14

[52] U.S. Cl. ...................................... 395/275; 395/162

[58] Field of Search ......................... 395/153, 162, 275

[56] References Cited

U.S. PATENT DOCUMENTS 5,038,301 8/1991 Thoma, III .......................... 395/153
5,257,350 10/1993 Howard et al. ..................... 395/162

OTHER PUBLICATIONS

IBM Technical Disclosure Bulletin, vol. 33, No. 5, Oct., 1990, pp. 289–291, New York, US; A. J. Morrish: "Improved Method of Monitor Identifiction and Mode Control".
IBM Technical Disclosure Bulletin, vol. 33, No. 6B, Nov., 1990, pp. 83–85, New York, US; D. A. Canton et al.: "Improvements to Display Identification".
IBM Technical Disclosure Bulletin, vol. 33, No. 6A, Nov., 1990 p. 351, New York, US; D. A. Canton et al.: "Monitor Identification Range Extension".

*Primary Examiner*—Robert L. Richardson
*Attorney, Agent, or Firm*—Martin J. McKinley

[57] ABSTRACT

A mechanism and method for setting display modes in computer systems associates a unique mode data set and identity (ID) function to each type of display monitor that is supported for attachment to the system. At system installation, mode data sets associated with all monitor types then supported by the system are stored on the system's hard disk in association with each video adapter currently active in the system and with the ID functions of the respective monitor types. Connectors which attach monitors to the system are constructed to provide indications of respective ID functions. Each connector has m ID indicating pins ($m>1$) which can be sensed by the system and used to form ID functions n bits long (where n is greater than m). Each time the system is powered on after installation, the ID function of the currently installed monitor, and other key data associated with the currently installed video adapter(s), are sensed and stored in a predefined location in system memory accessible to the system BIOS. When software that needs to control the monitor is first executed by the system, the software issues a predetermined BIOS function call causing the system BIOS to pass the stored ID and other key data to that software. Thereafter, while still active in the system, the software uses the ID to retrieve the associated mode data, and the mode data and the other key data to set operating modes in the installed video adapter and monitor. The BIOS call serves to isolate the software from system changes made subsequent to creation of the software. Storage of mode data sets and use of extended length ID's as disclosed presently allows the system to adjust efficiently to new monitor types and to support many more types than it otherwise could.

12 Claims, 5 Drawing Sheets

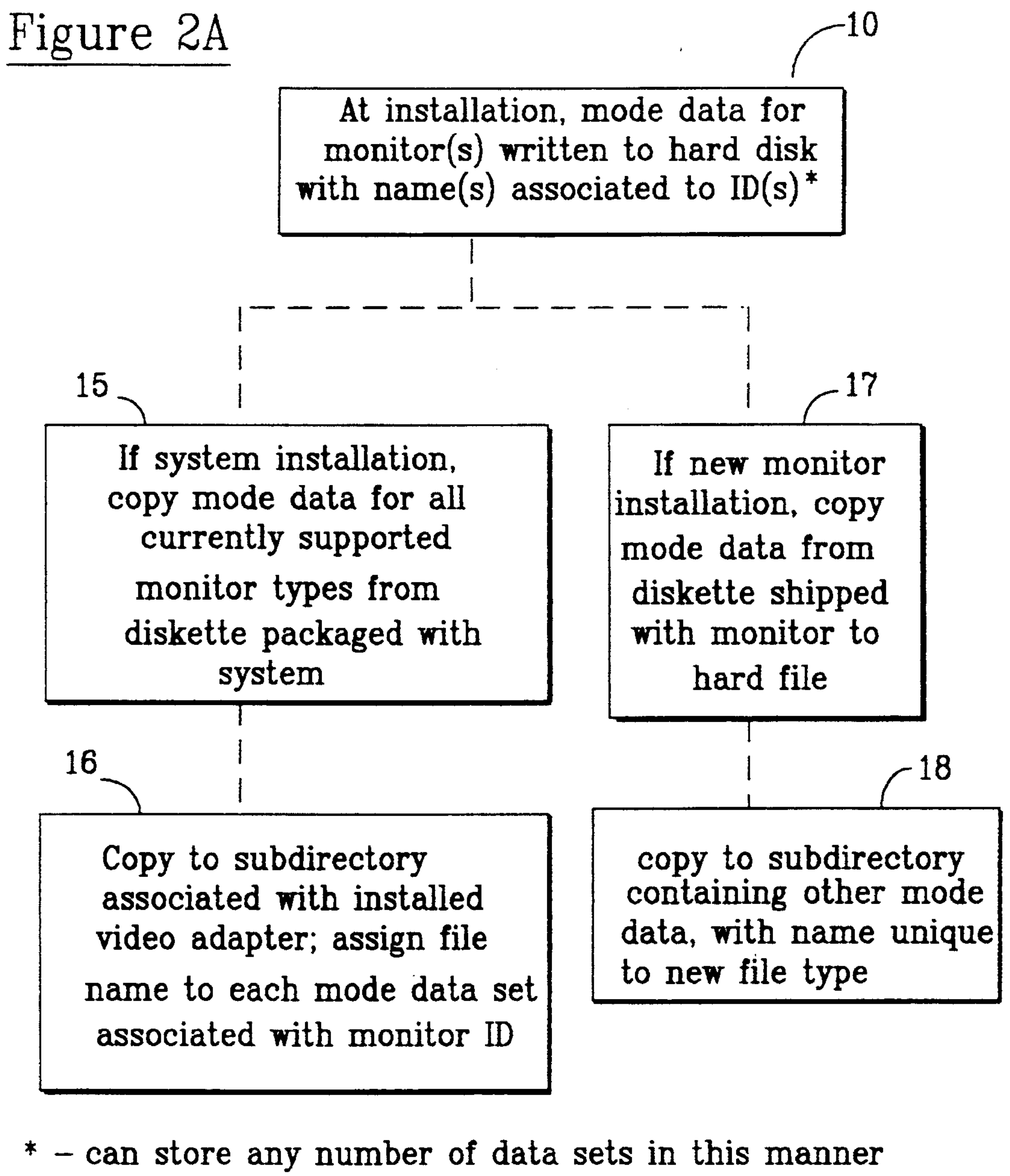
Figure 2A
10
At installation, mode data for monitor(s) written to hard disk with name(s) associated to ID(s)*
15
If system installation, copy mode data for all currently supported monitor types from diskette packaged with system
17
If new monitor installation, copy mode data from diskette shipped with monitor to hard file
16
Copy to subdirectory associated with installed video adapter; assign file name to each mode data set associated with monitor ID
18
copy to subdirectory containing other mode data, with name unique to new file type
* – can store any number of data sets in this manner Figure 3
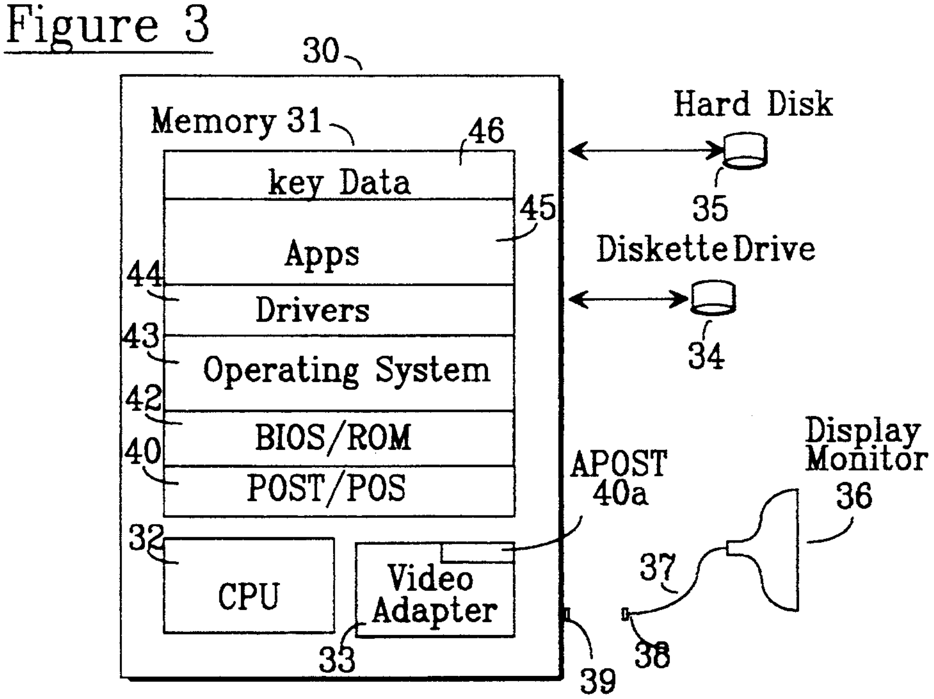
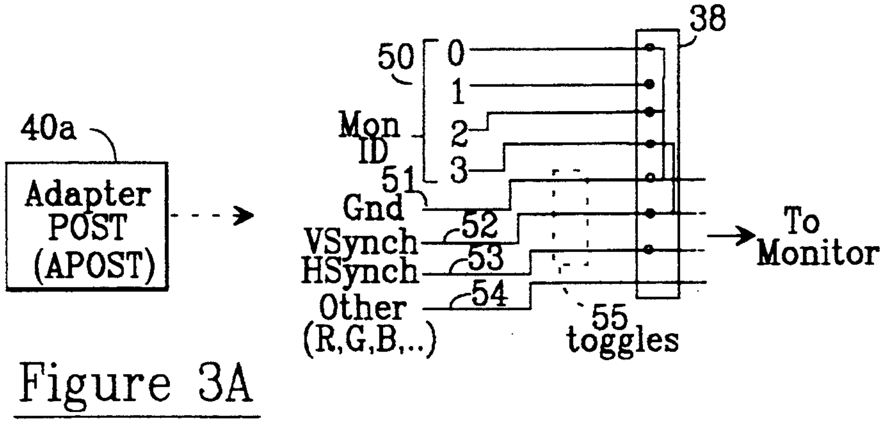
Figure 3A

DISPLAY MODE QUERY AND SET

FIELD OF THE INVENTION

This invention relates to a mechanism and method for setting up display mode configurations in computer systems.

BACKGROUND OF THE INVENTION

Rapid evolution of computer display technology has rendered techniques presently used for establishing operating modes of computer display monitors either inefficient or impractical. For example, in IBM Personal System/2 (PS/2)[1] systems, driver or application software requiring control of display monitor functions operate whenever activated to: (a) sense a 4-bit monitor identity (ID) function, by examining DC levels existing on 4 monitor ID pins in a standardized connector which links the display monitor to the computer's display adapter, (b) uses this ID information to locate monitor mode data, and (c) uses the monitor mode data to set the currently attached display monitor to a mode suitable for that monitor and the memory capacity of the system. The software operates in this manner each time that it is loaded for execution by the system. Each monitor attachable to the system has the ID pins in its connector uniquely attached to ground and non-ground potentials defining its respective type as one of 15 possible types that could be directly represented by 4 bit functions. In general, the monitor mode data is hard-coded into the software and carried with it through the system. If a new type display monitor is to be supported the software must be revised to incorporate the mode data for that monitor.

[1] IBM, Personal System/2 and PS/2 are trademarks of the International Business Machines Corporation.

A problem with this technique is that the connector ID pins as presently used do not allow more than 16 monitor types to be supported, and it is inefficient to consider storage of additional monitor mode data in the software to support new monitor types. At the present rate of introduction of new monitor types, it is becoming apparent that there is likely to be a need for supporting many more than 15 types in the near future. Accordingly, it is becoming necessary to consider how to provide extended support of additional monitor types in a cost effective and efficient manner.

It is recognized that for such extended support to be cost effective and efficient, it should be provided in a manner that is not logically inconsistent with techniques used presently for supporting attachment of presently known monitor types, and should not impose an inequitable burden on developers of new application and/or display driver software, or new display monitor hardware or their connectors. Such support, and any associated hardware and software, should also be "user friendly" so that attachment of a new type display monitor is made simple for users.

The present invention seeks to provide a mechanism and associated method for providing such extended support of additional monitor types, which could be integrated easily into existing systems.

OBJECTS OF THE INVENTION

A principal object of the present invention is to provide a mechanism and associated method for enabling a computer system: (a) to extend the number of different types of display monitors that it can support, while preserving compatibility with techniques used previously for supporting monitor attachment; (b) to simplify the handling of monitor mode data so that support of additional monitor types does not involve changes to software which controls monitor functions and does not complicate system usage; and (c) to operate in a manner which does not overly tax or inefficiently use system resources.

A related object is to provide a mechanism and associated method of extended monitor type support, as characterized above, in which mode data required for that function is stored efficiently in the system. Another related object is to provide such mechanism and method in which monitor identity (ID) information required to locate the stored mode data is located by means operating transparent to the display driver or application software which requires the mode data, in order to provide maximum flexibility within the system for changing and evolving procedures applied to the handling of such ID data without rendering existing driver or application software useless. A related object is to provide such mechanism and means in which the ID data is sensed and stored in memory during the power on self test (POST) process of the computer system, and passed from memory to driver or application software by function calls from that software to the Basic Input Output Software (BIOS) of the computer system.

SUMMARY OF THE INVENTION

These objects are realized by adapting the system to efficiently store monitor mode data relative to many types of display monitors, and adapting the system to make such data available to driver and application software in an efficient manner. When a system is initially assembled/installed, the setup procedure automatically stores monitor mode data on a system storage device (e.g. hard disk) for all then supported monitor types. The mode data is stored in a form allowing for efficient location and retrieval. If a new type monitor is attached to a previously installed system, and its mode data is not currently installed, the setup procedure for installation of the new device causes suitable mode data to be transferred to the system storage device from a diskette (or other storage medium) shipped with the new monitor.

After setup, each time the system is powered up, its power on self test (POST) process, operating through a POST subroutine called from the currently installed video adapter, determines the type/identity (ID) of the monitor currently installed. In this action, the video adapter of the system is set to an appropriate operating mode, and the four ID pins on the monitor connector are sensed iteratively, under several different conditions, to form an ID number containing more than 4 bits. This ID number, which is uniquely associated with the installed monitor, is stored in a memory area principally used by system BIOS. This ID is also uniquely associated with the mode data needed by the installed monitor (which was included with the data stored on the hard disk at setup).

Upon activation of driver or application software which needs to control the display monitor, that software places a function call to the BIOS causing the latter to pass the monitor ID (the ID stored in memory by POST) to the software. Using that ID, the software retrieves the associated monitor mode data and uses that data to set up a suitable operating mode for the installed monitor (e.g. a mode appropriate to that monitor and the amount of video memory available in the system).

In a preferred embodiment to be described, relative to IBM PS/2 systems using XGA[2] video adaptation, the system POST process gathers both the extended length monitor ID value as described above and other key data defining the operating mode of the installed video adapter. The ID and the other key data are stored in memory as described above and passed to the driver or application software by BIOS when needed by that software for controlling monitor operations. The other key data is gathered (by POST) from various system I/O ports and registers in a manner not considered presently relevant.

[2] XGA is a trademark of the International Business Machines Corporation.

If a fully setup system is susceptible of having a new display monitor "hot plugged" (i.e. connected while power is on, and possibly after completion of POST), the BIOS function call may include steps of resensing the monitor ID via the monitor connection, comparing the resensed value with the ID value stored by POST in memory, and substituting the resensed value if it does not match the previously sensed value.

Although the monitor mode data in the presently disclosed embodiment is stored on the system hard file, it should be understood that it could be stored on other types of storage devices; so long as it is stored in a non-volatile yet alterable form and in a form permitting its retrieval in association with the extended length monitor ID functions described above.

These and other features, effects, advantages and benefits associated with the present invention may be more fully understood and appreciated by considering the following description and claims.

DESCRIPTION OF THE DRAWINGS

FIG. 2A illustrates a detail of a function shown more generally in FIG. 2.

FIG. 3 is a block diagram illustrating elements of the system constituting the mechanism for implementing the technique of FIG. 2.

FIGS. 3A and 3B are used to explain details of FIG. 3.

DETAILED DESCRIPTION OF THE INVENTION

Figure 1:
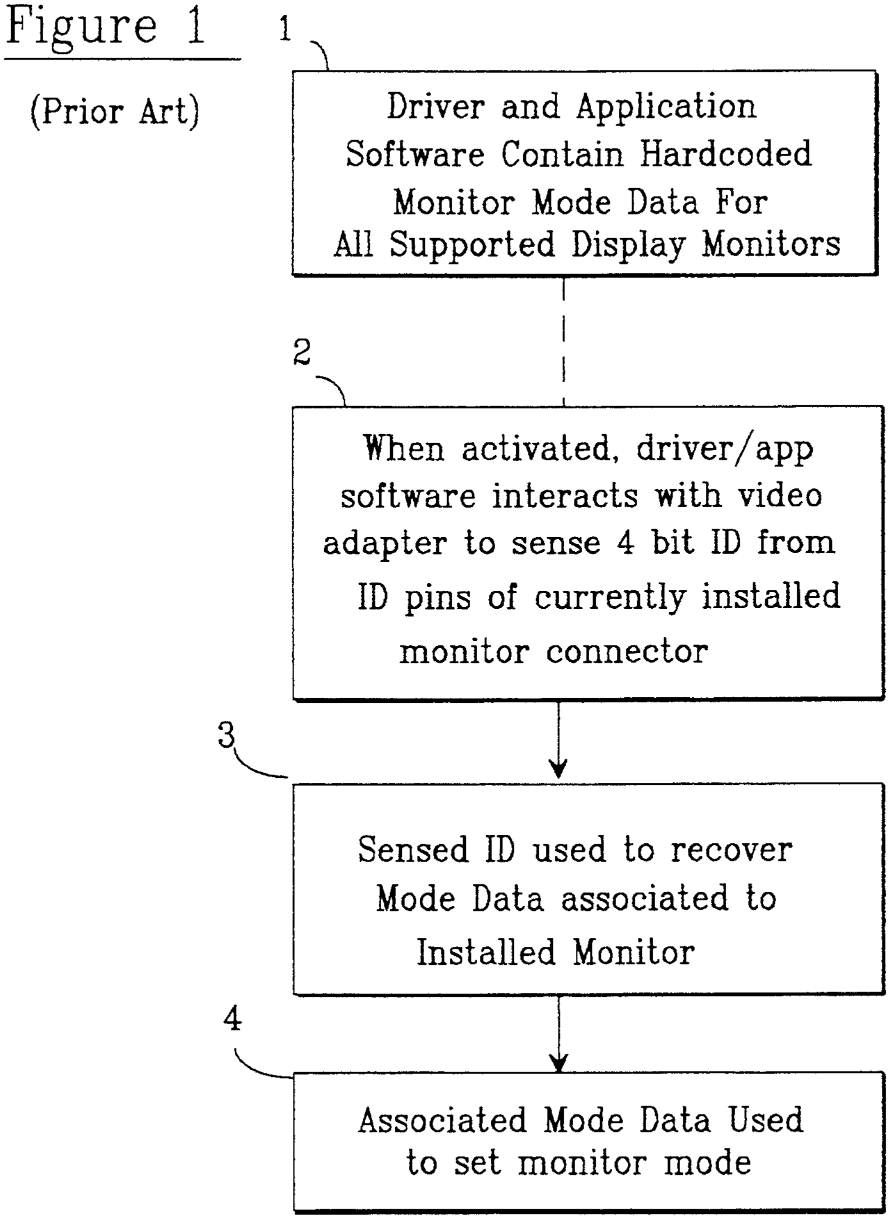
Figure 1 (Prior Art)
FIG. 1 is a simplified diagram of a prior art technique used to configure display monitor operating modes in PS/2 systems.

FIG. 1 illustrates a prior art technique used in existing PS/2 systems to configure attached display monitors. As shown at 1, driver and application programs requiring mode setting capability relative to the display monitor attached to the system are written to contain the mode setting data for all types of display monitors supported at the time of their release. To support a monitor type announced after such release, each driver/application must be revised and re-released.

As shown at 2, when each such driver or application is activated it interacts with the currently installed video adapter (e.g. VGA or XGA adapter) to sense ID pins in the connector through which the currently installed monitor is attached to the system. There are four such pins, and the sensing operation returns a four-bit ID function.

As shown at 3, this function is used to recover the mode data which must be contained ("hardcoded") in the program code of the respective driver or application (if it is not contained, a new release of the respective driver or application is needed). As indicated at 4, the recovered mode data is used to set the operational mode of the currently installed display monitor.

It is understood, that a four-bit ID function of the kind just discussed can represent at most sixteen ($2^4$) different values. Therefore, it is understood that this type of arrangement, can only support 16 or less monitor types.

Figure 2:
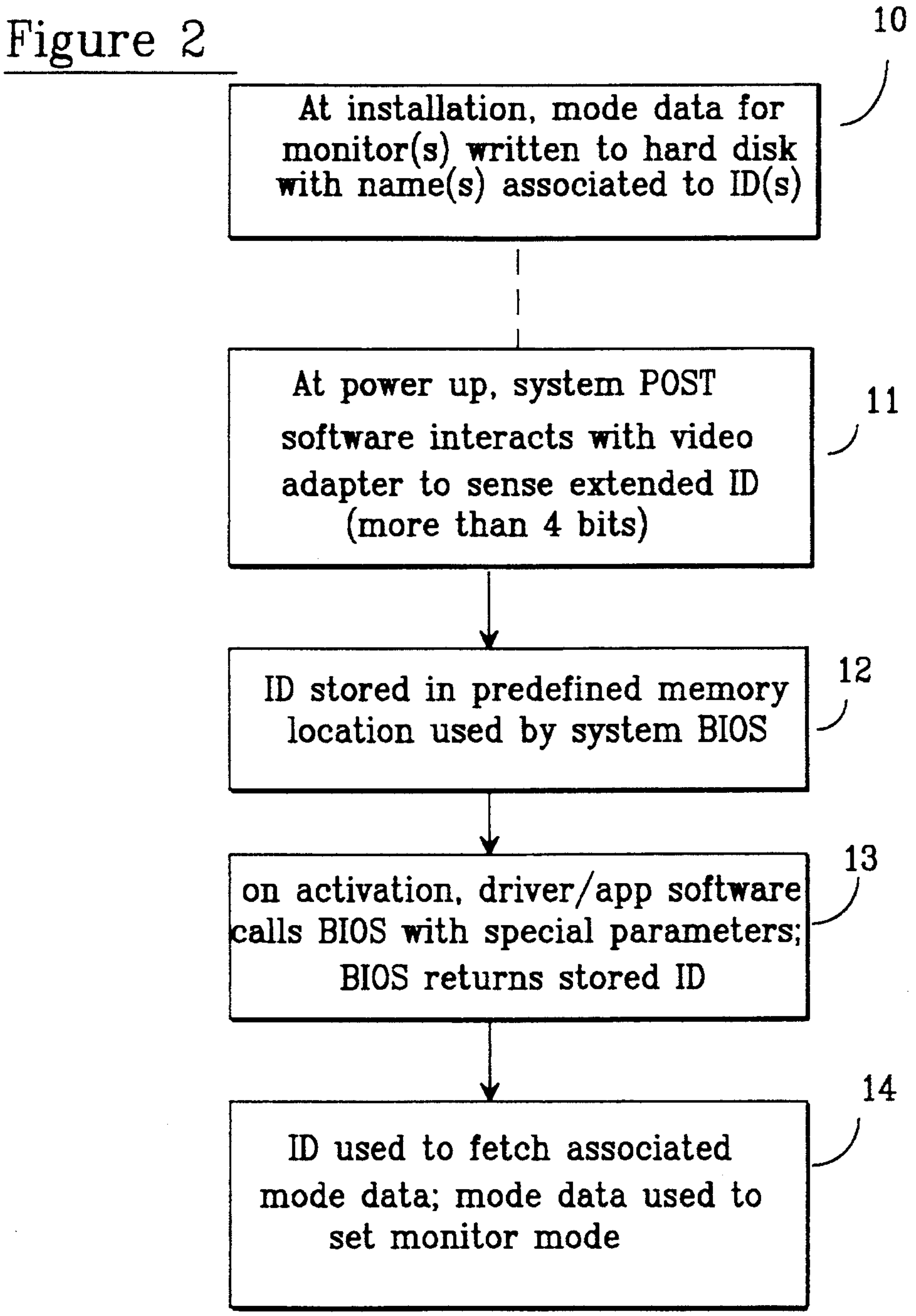
FIG. 2 is a simplified diagram illustrating the monitor mode configuring technique of the invention.

FIGS. 2 and 2A illustrate the technique used in accordance with the present invention to facilitate retention and modification of mode data for much more than sixteen different types of monitors. As shown at 10, at installation (as explained in FIG. 2A, this may be an installation of either a newly assembled system or of a new monitor to a previously installed system), mode data for a number of monitors is written to the system hard disk. The mode data associated with each supported monitor type is stored as a separate file, in a form which facilitates its recovery by association with an ID function uniquely assigned to the respective type (this is shown in FIG. 2A and explained further below relative to that figure).

As shown at 11 and 12 in FIG. 2, each time the system is powered up, the power up self test (POST) process programmably performed by the system includes a new subroutine for causing the ID value associated with the currently installed display monitor to be sensed and stored in a predefined location in system (volatile) memory, at an address location primarily used by the basic input output system (BIOS) which is used in input-output operations. The ID value that is so sensed and stored is a number containing a unique combination of more than four bits, and is therefore referred to herein as an extended length monitor ID.

As shown at 13, when driver or application software that needs to control the monitor is first loaded for execution, it calls BIOS and the latter passes the ID value stored by POST to the calling software. As shown at 14, each time it is executed, the software uses the ID to recover the mode data associated with the currently installed monitor (from the hard disk), and it uses that data to set the operating mode of the monitor.

As explained in FIG. 2A, at 15 and 16, if the system is being newly installed, a set of mode data for each then supported monitor (containing sufficient information for setting all required operating modes of the respective monitor) is copied to the hard disk drive of the system from a diskette packaged with the system or video adapter (e.g. during the system installation setup procedure). Each set is copied, as a separate file named in association with the ID assigned to the respective monitor, into a subdirectory (or subdirectories) assigned to the currently installed video adapter(s) with which the files may be used. The source files may reside on the diskette with the appropriate names and simply be copied to the hard disk with those names.

As explained at 17 and 18 in this figure, if a new monitor is being installed on a previously installed system, and its mode data is not currently contained on the hard disk, that data is copied with an appropriate name from a diskette packaged with the monitor to the subdirectory or subdirectories assigned to the installed video adapter(s) with which the monitor may be used.

FIG. 3 schematically shows elements of a typical PS/2 system to which the present invention is applicable. System 30 includes addressable memory 31 (both writable and read only), CPU 32 and video adapter 33, typically, an XGA adapter. Attached to the system are storage devices 34 (shown as a diskette drive) and 35 (shown as a hard disk drive) and display monitor 36. Monitor 36 has a signal cable 37 terminating in a connector 38 which plugs into a corresponding connector 39 on system 30. Connector 39 extends either from the motherboard of system 30 or (an edge of) adapter 33; from the motherboard if adapter 33 is mounted integrally on that board, or from the adapter if it is on an I/O card plugged into that board.

Memory 31 contains system software and data needed to configure the system and operating modes of adapter 33 and monitor 36; some of these items in volatile form and others in non-volatile form. Information for executing POST and other initialization processes is stored in non-volatile form at 40 and 40*a* (40*a* is the adapter POST, abbreviated APOST, which may be stored in the adapter and called by the main POST routine of the system). Associated with the other initialization processes is information for conducting a Program Option Select (POS) process and associated configuration data which is stored in a CMOS non-volatile memory 41.

The POS process and associated data in CMOS memory 41 are used to automatically initialize I/O adapters attached to the system in a manner described in U.S. Pat. No. 5,038,320 granted to C. Heath et al Aug. 6, 1991, and to automatically evoke a setup process for establishing correct configuration information in the CMOS and on drive 35 when a new adapter is installed. The source configuration information for such operations is generally provided through a diskette packaged with either the system or the adapter.

Memory 31 contains the system BIOS at 42, usually in read-only form. During and after system initialization, memory 31 contains information in volatile form which is taken from disk drives 34 and 35 as needed. This information includes parts of an Operating System at 43 (in volatile form), representing the supervisory software of the system (e.g. IBM Operating System/2[3]), device drivers at 44, parts or all of one or more currently active application programs at 45, and key data at 46 required to establish operating modes of adapter 33 and monitor 36 suitable for active drivers and applications. In this system, memory area 46 is used primarily by BIOS and the key data in that area includes the presently relevant monitor ID function and video adapter mode parameters that are sensed initially by POST (FIG. 2, step 11).

[3] Operating System/2 is a trademark of the International Business Machines Corporation.

FIG. 3A is used to explain how APOST 40*a* senses the (extended length) ID of the currently installed monitor. Monitor connector 38 has 15 pins; including four monitor ID pins (numbered 0 through 3) extending to system leads 50, a grounding pin extending to system ground 51, a VSynch and HSynch pins extending respectively to vertical synch control line 52 and horizontal synch control line 53 in the system, and eight other lines extending to respective lines 54 in the system (these other lines include lines R, G, B for controlling red, green and blue color functions respectively). Line 51 is permanently connected to system ground, and lines 52 and 53 are individually switchable between ground and non-ground potentials by circuits shown as toggles at 55.

Each monitor connector has a unique set of internal jumper lines establishing the respective ID. Representative jumpers are suggested in the figure by a jumper lead extending within the connector from ground pin/line 51 to monitor ID pins 0 and 2, and another lead extending from VSynch pin/line 52 to monitor ID pin 3. Thus, with the indicated jumper from line 51, monitor ID pins 0 and 2 are always grounded, and with the indicated jumper from line 52, monitor ID pin 3 can be either grounded or not grounded depending upon the toggled state of line 52.

If grounded and not grounded ID pins are sensed as respectively indicating 0 and 1 numerical bit values, it is seen that with indicated jumpers ID pins 0–3 are indicating are indicating binary sequence 0100 when line 52 is connected and 0101 when line 52 is connected to a potential other than ground. Not shown in this simplified illustration, but understood as permissible, are other jumper leads from HSynch line 53 to the ID pins. Thus, by operating APOST through adapter 33 to toggle lines 52 and 53 singly and together, three or more sets of 4-bit binary values are obtainable to represent a binary number having at least 8 bits uniquely associatable with the physical configuration of jumpers in the connector 38; i.e. the jumpers can be configured to indicate at least 256 different monitor types.

As noted earlier, at each power on of an installed (setup) system, the ID function is sensed along with other key data by POST, and stored in memory (memory area 46, FIG. 3). POST "hooks" this storage operation to a particular function call (INT 10) of the system video BIOS, providing the video BIOS with information defining the size of the entire set of key data, relative to all currently installed video adapters, and a pointer to a starting location for that data in memory area 46.

The first time that driver or application software requires access to the key data (i.e. the first time such software is activated for execution in the system), it places an INT 10 function call to the system's video BIOS, causing the latter to pass the key data parameters stored in memory area 46 (or an address pointing to those parameters in that area). Thereafter, so long as the system remains powered, and the software remains active, the software maintains direct access to the key data so that it does not have to repeat the BIOS call to use that data.

Incidentally, it should be noted that the key data stored in area 46 is used primarily by display drivers. Applications dependent on such drivers would not usually require separate access; but applications not so dependent (e.g. specialized graphics applications) might require separate access.

After receiving the key data, the driver or application, uses the (extended length) monitor ID to access hard disk 35 and retrieve the monitor mode data for the currently installed monitor, and then it uses the other key data and the monitor mode data to set up appropriate operating modes in adapter 33 and, through the adapter, in monitor 36.

The key data other than the monitor ID typically would comprise the following information relative to a system having one or more installed XGA adapters:

Implementation levels of installed XGA adapters

Locations of XGA I/O registers in system I/O address space

Locations of memory mapped XGA registers in system memory address space

Locations in system memory address space of memory mapped apertures assigned to XGA adapters The size of memory space usable as video memory and pointers to locational reference positions in that space Mode data associated with each supported monitor type comprises at least the following information:

Physical dimensions of display viewing area and visible attributes of the display (color, mono, CRT, LCD, etc.)

The number of different extended graphics modes available on the display

Figure 3B:
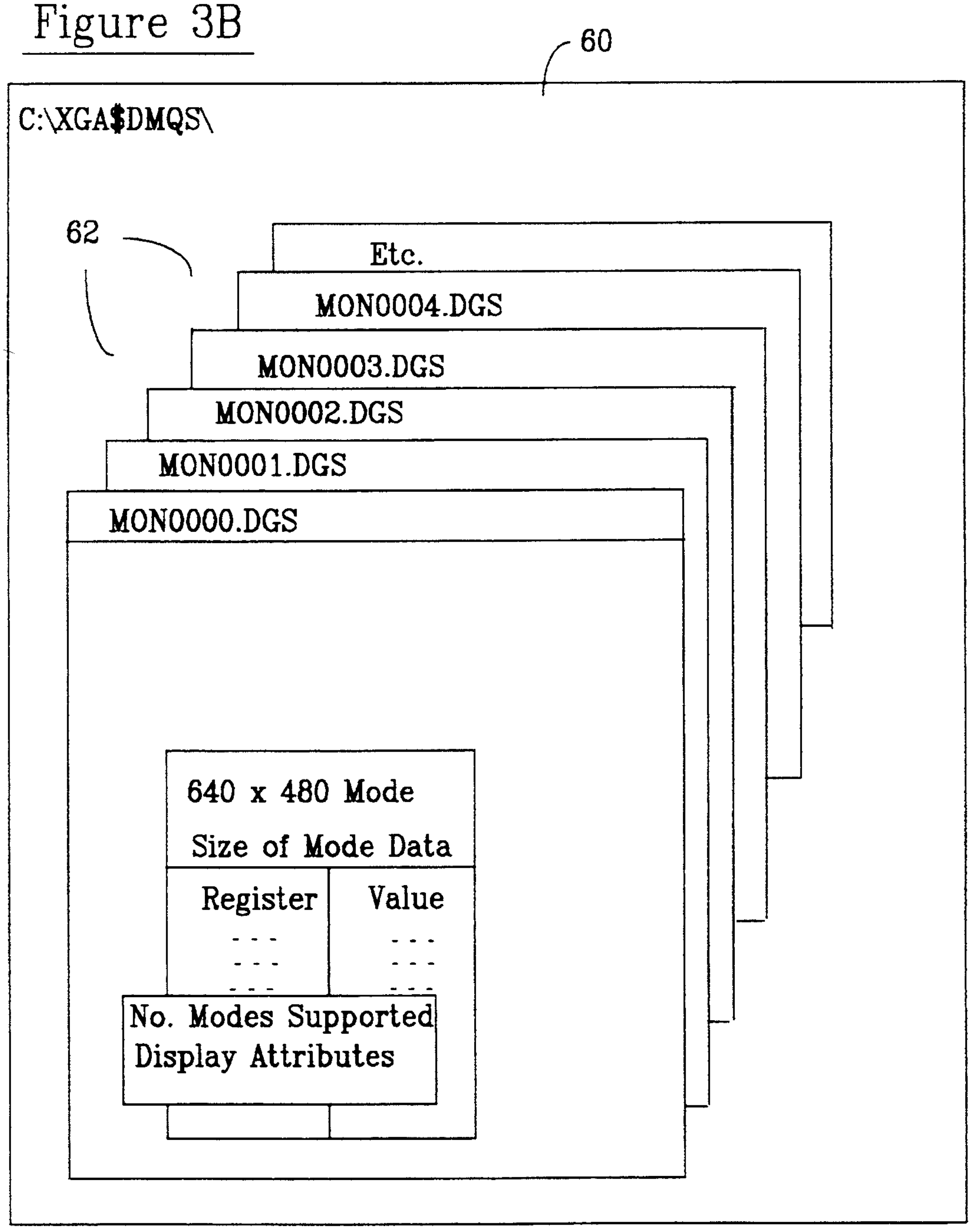

For each available extended graphics mode:

the mode dimensions the minimum level of XGA adapter supporting that mode standard register settings for placing the XGA adapter in that mode Using the other key data and the mode data locatable with the monitor ID, the driver/application can determine:

capabilities and characteristics of the installed XGA adapter and monitor locations of all XGA registers and display buffers modes available on the adapter/display combination data for setting each available mode File names and content of monitor mode data files stored on the hard disk drive are suggested in FIG. 3B. Each installed video adapter is assigned a subdirectory, in the root directory from which the system is usually booted up (e.g. the "C" directory), in which the monitor mode data to be used with that adapter is stored. One such subdirectory is indicated at 60. It is understood that another root directory could be used for this purpose, so long as the driver/application programs which will be using the mode data are made aware of the correct directory. The subdirectory name should be associated with the corresponding adapter as indicated by the name shown at the upper left in box 60.

Individual mode data files, associated with all monitor types currently supported by the adapter, are suggested by boxes 62. Each file contains a filename and suffix, indicated at the top of the box, characterizing it as a mode data set (e.g. to distinguish such files from other files which may be stored in the same subdirectory). The filename contains a number associated with the monitor ID function (0000, 0001, etc.). The files need not be stored in any order associated with these numbers.

Each file contains data for setting each operating mode supported by the respective monitor type and adapter, and information facilitating location of such data and explaining attributes of the monitor type. The latter information includes:

file length number of modes supported display type (CRT, LCD, color, mono, . . . )

height and width of screen offsets of data for individual modes from the beginning of the file The mode setting data for the various modes are in variable length tables, and may include:

byte length of respective table pixel height and width mode register locations values to be set in the registers As noted earlier, such data is written to the hard file from a source diskette at system installation and when a new type monitor is installed on an old system. It is understood that the diskette and hard drive represent current state of the art storage devices useful for this purpose, and that other devices could be used as well. The only requirement is that the files as stored in the system be accessible in association with the adapter type and the monitor ID.

We claim:

1. In a computer system containing a processor, a memory subsystem, a video adapter, a connector for attaching a display monitor to the system, and a peripheral storage device having a storage area thereon reserved for said video adapter, wherein a monitor identity (ID) function, identifying the type of monitor currently attached to the system is sensed by interrogating pins on said connector, a mechanism for flexibly adapting the system to support attachment thereto of more than $2^n$ different types of display monitors, said mechanism comprising:

means for storing sets of display mode data in storage files contained in said reserved area of said peripheral storage, said files being associated with different types of display monitor devices attachable to said connector when said system was first placed in use, as well as with any new type of display monitor device that has been attached to said system connector after the system was first placed in use; said files being stored to be retrievable in direct association with ID functions preassigned to respective said display monitor types; one of said files being associated with a display monitor currently attached to and installed in said system;

means coupled to said display monitor connector, and activated when said system is initially powered up, for sensing an extended length monitor ID function uniquely associated with a monitor currently attached to said connector and for storing said sensed function in a predetermined location in said memory subsystem; said extended length ID function containing more than n bits sensed by interrogating n pins on said connector, and thereby being useful to identify one of more than $2^n$ different monitor types; and means responsive to requests issued by display driver programs, as respective said driver programs are activated in said system, for transferring said extended length ID function from said predetermined location in said memory subsystem to respective said programs, enabling the respective programs to use said transferred function to obtain access to a mode data file on said peripheral storage device which contains mode data uniquely associated with the type of monitor currently attached to said connector and the type of video adapter currently installed in said system. [coupled to said sensing means for retrieving a mode data set uniquely associated with the currently attached monitor in association with the ID function sensed by said sensing means.]

2. A mechanism in accordance with claim 1 wherein said system contains a BIOS (Basic Input Output System) program which is used by said system for performing basic input-output functions, and wherein said means responsive to said requests from said driver programs includes:

a BIOS subprogram representing a portion of said BIOS program, said BIOS subprogram being adapted in response to a predetermined function call issued by said driver programs to retrieve said extended length ID function from said predetermined memory subsystem location.

3. A mechanism in accordance with claim 2 wherein said system contains an XGA video adapter interfacing to said display monitor connector, and said means for sensing and storing said extended length ID function comprises:

a portion of a power on self test (POST) program stored in said XGA adapter and automatically called from said adapter by said system at system power on; said XGA adapter including means directed by said portion of said POST program for repeatedly sensing n pins on said monitor connector and for using pin voltage values sensed thereby to form an ID function containing m bits where m is greater than n.

4. A method for adapting a computer system having a standardized display monitor connector to operate with plural different types of display monitors, including display monitor types which may not have existed when the system was first placed in use, comprising:

assigning a unique ID function to each monitor type to be supported;

storing a unique set of mode defining data in said system, for each said monitor type to be supported, in a form in which each said stored set is uniquely associated with a single said monitor type and directly retrievable in association with the ID function assigned to the respective monitor type, and in a form in which a set of mode data associated with a monitor type that did not exist when the system was first placed in use can be economically added to the sets stored when said system was first placed in use; each said stored mode data set including all information needed to set all required operating modes of the respectively associated monitor type;

at each power on of said system, interacting with said standardized connector to sense an ID function assigned to a monitor then attached to said connector; and storing said sensed ID function in a predetermined memory location of said system in which said ID function is readily accessible to programs requiring control of said attached monitor.

5. The adapting method of claim 4 including adapting said programs requiring control of said attached monitor, when activated by said system, to:

retrieve said ID function from said predetermined memory location;

use said retrieved ID function to associatively retrieve one of said stored sets of mode data associated with said attached monitor in direct association with said retrieved ID function; and set a mode of operation of said attached monitor suited to the program retrieving said mode data and the available resources of said system.

6. The method of claim 4 wherein said ID function assigned to each said monitor type is defined by n bits of information and wherein the ID function of the currently attached monitor is determined by:

repeatedly sensing voltages at m (<n) pins on said standardized connector, under various conditions determinable by said system, each condition establishing a subset of the bits forming the ID function of the installed monitor, and the aggregate of all conditions yielding all of said m bits of the ID function assigned to said attached monitor.

7. A mechanism for adapting a computer system to support attachment thereto of plural different types of display monitors, including types of display monitors not in existence when the system is first placed in use, comprising:

storage means peripherally attached to said system for storing plural monitor mode data sets respectively associated with plural different types of display monitors that are attachable to said system when said system is first being placed in use; said storage means storing said data sets in a non-volatile form such that: (a) the number of data sets which can be stored and the size of each set are virtually unlimited; (b) a new data set can be stored in said storing means, after said system has been placed in use, at very little cost to manufacturers and end users of said system; and (c) said data sets are easily retrievable by said system in association with monitor identity (ID) functions respectively assigned to said different types of display monitors;

means effective when a display monitor is newly attached to said system for: sensing an ID function defining the respective type of said newly attached monitor; determining if said sensed ID function is associated with one of the monitor mode data sets currently stored in said storage means; and responsive to a determination that said sensed ID is not associated with one of said currently stored data sets for installing a new data set in said storing means in association with said sensed ID function; and means effective at power on initialization of said system, when the monitor attached to said system is the same as the monitor that was attached to said system when power was last removed from said system, for sensing the ID function of the monitor currently attached to said system and for storing that ID function in a form in which it is readily available for use by display driver programs activated subsequent to said initialization; said stored ID function being useful by said subsequently activated driver programs for obtaining access to a monitor mode data set on said storage means which is uniquely associated with said stored ID function.

8. An adapting mechanism in accordance with claim 7, for use in a computer system having a random access memory subsystem and a standardized connector for attachment of a monitor, said standardized connector having n pins available for sensing said ID function, and at least one other pin normally used for functions unrelated to ID sensing, wherein:

said storage means stores said monitor mode data sets in association with extended length ID functions containing more than n bits; and said means effective at power on initialization of said system interrogates said n pins repeatedly, while variably toggling said at least one other pin, to sense a said extended length ID function uniquely associated with the monitor instantly attached to said standardized connector and to store said sensed extended length function in a predetermined address location in said memory subsystem.

9. An adapting mechanism in accordance with claim 8 wherein:

said storage means is a disk file device peripherally attached to said computer system.

10. An adapting mechanism in accordance with claim 8 wherein:

said monitor mode data sets are stored in a subdirectory of said disk file device that is allocated by said system for display adaptation and individual said data sets are stored with file names having direct associations to extended length ID functions associated with respective sets.

11. An adapting mechanism in accordance with claim 10 wherein said system contains a specialized video adapter for controlling operations of a monitor attached to said system, and wherein said subdirectory of said disk file device is named in direct association with said specialized video adapter.

12. An adapting mechanism in accordance with claim 8, for use in a system permitting "hot" detachment and attachment of monitors at said standardized connector, after said system has been powered up and initialized, said mechanism comprising:

means effective upon hot attachment of a said monitor to said standardized connector to: resense the extended length ID function of the monitor instantly attached to said connector; compare the sensed function to the said extended length ID function stored in said memory subsystem at power on initialization of said system; and store the resensed ID function in said memory subsystem, in place of the ID function stored at power on initialization, if the compared functions are unequal.

* * * * *